(12) United States Patent
Nakano et al.

(10) Patent No.: US 6,758,559 B1
(45) Date of Patent: Jul. 6, 2004

(54) WATER-BASED INK FOR INK-JET RECORDING

(75) Inventors: Yukihiro Nakano, Wakayama (JP); Michitaka Sawada, Wakayama (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 10/111,678

(22) PCT Filed: Oct. 25, 2000

(86) PCT No.: PCT/JP00/07449

§ 371 (c)(1), (2), (4) Date: Apr. 26, 2002

(87) PCT Pub. No.: WO01/30924

PCT Pub. Date: May 3, 2001

(30) Foreign Application Priority Data

Oct. 28, 1999 (JP) .......... 11-307676

(51) Int. Cl.$^7$ .............. B41J 2/01
(52) U.S. Cl. .......... 347/100; 347/95; 523/160
(58) Field of Search .......... 347/100, 95, 96; 106/31.27, 31.6, 31.13; 523/160, 161

(56) References Cited

U.S. PATENT DOCUMENTS

| 5,852,074 | A | * | 12/1998 | Tsutsumi et al. .......... 347/100 |
| 5,998,501 | A | | 12/1999 | Tsutsumi et al. |
| 6,020,400 | A | * | 2/2000 | Anton et al. .......... 106/31.13 |
| 6,031,019 | A | | 2/2000 | Tsutsumi et al. |
| 6,114,411 | A | | 9/2000 | Nakamura et al. |

FOREIGN PATENT DOCUMENTS

| EP | 0791610 A2 | * | 2/1997 | .......... C09D/11/00 |
| EP | 791610 A2 | | 8/1997 | |
| EP | 857766 A1 | | 8/1998 | |
| EP | 0899311 A1 | | 3/1999 | |
| EP | 0933406 A1 | | 8/1999 | |
| EP | 0943666 A2 | | 9/1999 | |
| EP | 0985715 A2 | | 3/2000 | |
| EP | 0997288 A2 | | 5/2000 | |
| JP | 4-332774 | | 11/1992 | |
| JP | 10-152640 | | 6/1998 | |
| JP | 10-338829 A | | 12/1998 | |
| JP | 2000-191967 A | | 7/2000 | |
| JP | 2000-191967 | * | 7/2000 | .......... B41J/2/01 |

* cited by examiner

Primary Examiner—Stephen Meier
Assistant Examiner—Manish Shah
(74) Attorney, Agent, or Firm—Birch, Stewart, Kolasch & Birch, LLP

(57) ABSTRACT

A water-based ink for inkjet printing, including (A) an aqueous dispersion A of vinyl polymer particles prepared by including an oil-soluble black dye or carbon black in a water-insoluble vinyl polymer prepared by copolymerizing a salt-forming group-containing monomer (a), a monomer (b) represented by the formula (I):

$$CH_2=C(R^1)COO(R^2O)_pR^3 \qquad (I)$$

wherein $R^1$ is hydrogen atom or a lower alkyl group; $R^2$ is a divalent hydrocarbon group which may have a hetero-atom; $R^3$ is a monovalent hydrocarbon group which may have a hetero-atom; p is a number of 1 to 60, a macromer (c), a monomer (d) copolymerizable with these monomers; and (B) an aqueous dispersion B of carbon black having the same ionicity as the aqueous dispersion A, wherein the weight ratio of the solid content of the aqueous dispersion A to the solid content of the aqueous dispersion B (the solid content of the aqueous dispersion A/the solid content of the aqueous dispersion B) is 5/95 to 95/5.

4 Claims, No Drawings

WATER-BASED INK FOR INK-JET RECORDING

This application is the national phase under 35 U.S.C. § 371 of PCT International Application No. PCT/JP00/07449 which has an International filing date of Oct. 25, 2000, which designated the Unite State of America.

TECHNICAL FIELD

The present invention relates to a water-based ink for inkjet recording.

BACKGROUND ART

Inkjet recording is carried out by directly jetting ink droplets from very fine nozzles to a recording medium, and depositing the ink droplets on the recording medium, to form characters or images. As a colorant for black ink used for inkjet printing, a water-soluble black dye or an aqueous dispersion of carbon black has been used. The water-soluble black dye is excellent in jetting stability. However, there are some defects in the dye such that the dye is poor in water resistance and light fastness. Also, the aqueous dispersion of carbon black gives a high optical density. However, there are some defects in the aqueous dispersion of carbon black such that the aqueous dispersion of carbon black is poor in fixing ability on a paper surface, rubbing resistance and high-lighter fastness.

Therefore, for the purposes of improving fixing ability of the aqueous dispersion of carbon black on a paper surface, there has been proposed addition of a polymer emulsion giving film-forming ability to the aqueous dispersion of carbon black (Japanese Patent Laid-Open Nos. Hei 9-208870 and Hei 10-195355 and Hei 10-152640). When a large amount of the polymer emulsion is added, the fixing ability is improved. However, there are some defects in the polymer emulsion such that the optical density is lowered because the polymer emulsion does not act as a colorant. In addition, when the polymer emulsion is added within the range satisfying the optical density, the fixing ability is little improved.

In recent years, for the purposes of improving fixing ability and water resistance, there has been proposed an aqueous dispersion of a vinyl polymer containing an oil-soluble black dye (Japanese Patent Laid-Open No. Hei 9-241565). When this aqueous dispersion is used as an ink colorant, the fixing ability and the water resistance are surely improved, thereby exhibiting optical density like a water-soluble dye. However, the optical density would be insufficient for uses requiring a high optical density. Therefore, there are some defects in the aqueous dispersion such that the stability is lowered when the amount of an oil-soluble dye in the aqueous dispersion is increased for the purpose of improving the optical density, and that the viscosity is increased when the amount of the aqueous dispersion used is increased, thereby lowering the discharging ability.

DISCLOSURE OF INVENTION

An object of the present invention is to provide a water-based ink for inkjet recording showing high optical density, not giving distortion including crookedness to printed objects, and showing excellent water resistance, rubbing resistance and high-lighter fastness.

The present invention relates to a water-based ink for inkjet printing, comprising:

(A) an aqueous dispersion A of vinyl polymer particles prepared by including an oil-soluble black dye or carbon black in a water-insoluble vinyl polymer prepared by copolymerizing a salt-forming group-containing monomer (a) [hereinafter referred to as component (a)], a monomer (b) represented by the formula (I):

$$CH_2=C(R^1)COO(R^2O)_pR^3 \tag{I}$$

wherein $R^1$ is hydrogen atom or a lower alkyl group; $R^2$ is a divalent hydrocarbon group which may have a hetero-atom; $R^3$ is a monovalent hydrocarbon group which may have a hetero-atom; p is a number of 1 to 60 [hereinafter referred to as component (b)], a macromer (c) [hereinafter referred to as component (c)], a monomer (d) copolymerizable with these monomers [hereinafter referred to as component (d)]; and (B) an aqueous dispersion B of carbon black having the same ionicity as the aqueous dispersion A, wherein the weight ratio of the solid content of the aqueous dispersion A to the solid content of the aqueous dispersion B (the solid content of the aqueous dispersion A/the solid content of the aqueous dispersion B) is 5/95 to 95/5.

BEST MODE FOR CARRYING OUT THE INVENTION

As the vinyl polymer used for the aqueous dispersion A, a water-insoluble vinyl polymer is used, and in order to obtain a water-based ink having both high fixing ability and high dispersion stability, there is used a water-insoluble vinyl polymer obtained by copolymerizing the component (a), the component (b), the component (c) and the component (d). or an anionic group when the group is neutralized with an acid or a base.

Representative examples of the component (a) include the cationic monomers and the anionic monomers described in page 5, column 7, line 24 to column 8, line 29 of Japanese Patent Laid-Open No. Hei 9-286939.

The cationic monomer includes tertiary amine-containing unsaturated monomers, ammonium salt-containing unsaturated monomers, and the like. Among them, N,N-dimethylaminophenyl acrylate, N,N-dimethylaminoethyl methacrylate, N-(N',N'-dimethylaminopropyl) acrylamide, N-(N',N'-dimethylaminopropyl) methacrylamide and vinylpyrrolidone are preferable.

The anionic monomer includes unsaturated carboxylic acid monomers, unsaturated sulfonic acid monomers, unsaturated phosphoric acid monomers, and the like. Among them, unsaturated carboxylic acid monomers, especially acrylic acid and methacrylic acid are preferable.

The component (b) exhibits excellent effects of increasing the jetting stability of the water-based ink of the present invention, and suppressing the generation of distortion even when printing is continuously carried out.

In the formula (I), $R^1$ is hydrogen atom or a lower alkyl group. The lower alkyl group includes linear or branched alkyl groups having 1 to 4 carbon atoms.

$R^2$ is a divalent hydrocarbon group which may have a hetero-atom. The hetero-atom includes, for example, nitrogen atom, oxygen atom, a halogen atom and sulfur atom.

Representative examples of $R^2$ include an aromatic ring having 6 to 30 carbon atoms, which may have a substituent; a heterocyclic ring having 3 to 30 carbon atoms, which may have a substituent; and an alkylene group having 1 to 30 carbon atoms, which may have a substituent. These rings or groups may be used in combination of at least two kinds. The substituent includes an aromatic ring having 6 to 29 carbon atoms; a heterocyclic ring having 3 to 29 carbon atoms; an alkyl group having 1 to 29 carbon atoms; a halogen atom; amino group, and the like.

Preferred examples of $R^2$ include a phenylene group which may have a substituent having 1 to 24 carbon atoms; an aliphatic alkylene group having 1 to 30 carbon atoms, preferably 1 to 20 carbon atoms; an aromatic ring-containing alkylene group having 7 to 30 carbon atoms; and a heterocyclic ring-containing alkylene group having 4 to 30 carbon atoms.

In addition, preferred examples of $R^2O$ group include alkylene oxide groups having 2 to 7 carbon atoms such as ethylene oxide group, (iso)propylene oxide group, tetramethylene oxide group, heptamethylene oxide group, hexamethylene oxide group, and combinations of at least two kinds of these tri 15 alkylene oxide groups; and phenylene oxide group.

$R^3$ is a monovalent hydrocarbon group which may have a hetero-atom. The hetero-atom includes nitrogen atom, oxygen atom and sulfur atom. Representative examples of $R^3$ include an aromatic ring having 6 to 30 carbon atoms, which may have a substituent; a heterocyclic ring having 3 to 20 30 carbon atoms, which may have a substituent; and an alkyl group having 1 to 30 carbon atoms, which may have a substituent. The substituent includes an aromatic ring having 6 to 29 carbon atoms; a heterocyclic ring having 4 to 29 carbon atoms; a halogen atom; amino group, and the like.

Preferred examples of $R^3$ include phenyl group, an aliphatic alkyl group having 1 to 30 carbon atoms, preferably 1 to 20 carbon atoms, an aromatic ring-containing alkyl group having 7 to 30 carbon atoms, and a heterocyclic ring-containing alkyl group having 4 to 30 carbon atoms.

More preferred examples of $R^3$ include alkyl groups having 1 to 6 carbon atoms, such as methyl group, ethyl group, (iso)propyl group, (iso)butyl group, (iso)pentyl group and (iso)hexyl group; phenyl group, and the like.

p is a number of 1 to 60, out of which a number of 1 to 30 is preferable.

Concrete examples of the alkylene oxide group-containing monomer represented by the formula (I) include methoxypolyethylene glycol (1–30: p value in the formula (1), hereinafter referred to the same) (meth)acrylates, methoxypolytetramethylene glycol (1–30) (meth)acrylates, ethoxypolyethylene glycol (1–30) (meth)acrylates, (iso) propoxypolyethylene glycol (1–30) (meth)acrylates, butoxypolyethylene glycol (1–30) (meth)acrylates, methoxypolypropylene glycol (1–30) (meth)acrylates, propoxypolypropylene oxide (1–30) (meth)acrylates, methoxy (ethylene glycol-propylene glycol copolymer) (1–30, out of which ethylene glycol: 1–29) (meth)acrylates, and the like. These monomers can be used alone or in admixture of at least two kinds. Among them, methoxypolyethylene glycol (1–30) (meth)acrylates are preferable. Incidentally, the term "(meth)acrylate" as used herein means acrylate or methacrylate. Also, the term "(iso)propoxy" as used herein means n-propoxy or isopropoxy.

The component (c) includes macromers which are monomers having a polymerizable unsaturated group and a number-average molecular weight of 500 to 100000, preferably 1000 to 10000. Among them, a silicone macromer represented by the formula (II):

wherein X is a polymerizable unsaturated group; Y is a divalent group; each of $R^4$ is independently hydrogen atom, a lower alkyl group, an aryl group or an alkoxy group; Z is a monovalent siloxane polymer residue having a number-average molecular weight of at least 500; q is 0 or 1; and r is an integer of 1 to 3, and/or a styrenic macromer having a polymerizable functional group at one end is preferable.

The number-average molecular weight of the macromer is determined by gel chromatography using polystyrene as a standard substance and chloroform containing 1 mmol/L of dodecyldimethylamine as a solvent.

The silicone macromer can be favorably used from the viewpoint of preventing scorching on the printer head of an inkjet printer.

In the silicone macromer represented by the formula (II), X includes a monovalent unsaturated hydrocarbon group having 2 to 6 carbon atoms, such as $CH_2=CH-$ group and $CH_2=C(CH_3)-$ group. Y includes divalent groups such as $-COO-$ group, a $-COOC_aH_{2a}-$ group, wherein a is an integer of 1 to 5, and a phenylene group. Among them, $-COOC_3H_6-$ is preferable. $R^4$ includes hydrogen atom; a lower alkyl group having 1 to 5 carbon atoms, such as methyl group and ethyl group; an aryl group having 6 to 20 carbon atoms, such as phenyl group; an alkoxy group having 1 to 20 carbon atoms, such as methoxy group, and the like. Among them, methyl group is preferable. Z is preferably a monovalent dimethylsiloxane polymer residue having a number-average molecular weight of 500 to 5000. q is 0 or 1, and preferably 1. r is an integer of 1 to 3, and preferably 1.

Representative examples of the silicone macromer include a silicone macromer represented by the formula (II-1):

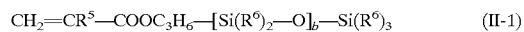

wherein $R^5$ is hydrogen atom or methyl group; each of $R^6$ is independently hydrogen atom or a lower alkyl group having 1 to 5 carbon atoms; and b is a number of 5 to 65;

a silicone macromer represented by the formula (II-2):

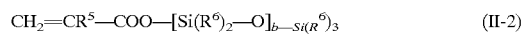

wherein $R^5$, $R^6$ and b are the same as defined above;

a silicone macromer represented by the formula (II3):

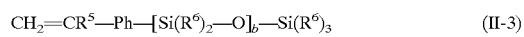

wherein Ph is a phenylene group; and $R^5$, $R^6$ and b are the same as defined above;

a silicone macromer represented by the formula (II-4):

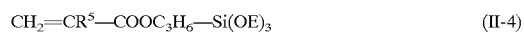

wherein $R^5$ is the same as defined above; E is a group represented by the formula $-[Si(R^5)_2O]_c-Si(R^5)_3$, wherein $R^5$ is the same as defined above, and c is a number of 5 to 65;

and the like.

Among them, the silicone macromer represented by the formula (II-1) is preferable, and a silicone macromer represented by the formula (II-1a)

wherein d is a number of 8 to 40, is especially preferable. Examples of the silicone macromer include a silicone macromer manufactured by CHISSO CORPORATION under the trade name of. FM-0711, and the like.

The styrenic macromer can be favorably used, since an oil-soluble black dye or carbon black is sufficiently included in the vinyl polymer.

The styrenic macromer includes styrene homopolymers having a polymerizable functional group at one end, or copolymers of styrene with the other monomer. Among them, those having acryloyloxy group or methacryloyloxy group as a polymerizable functional group at one end are preferable. It is desired that the content of styrene in the above-mentioned copolymer is at least 60% by weight, preferably at least 70% by weight, from the viewpoint of sufficiently including carbon black in the vinyl polymer. The other monomer mentioned above includes acrylonitrile, and the like.

The component (d) includes (meth)acrylates such as methyl (meth)acrylate, ethyl (meth)acrylate, (iso)propyl (meth)acrylate, (iso or tertiary)butyl (meth)acrylate, (iso) amyl (meth)acrylate, cyclohexyl (meth)acrylate, benzyl (meth)acrylate, 2-ethylhexyl (meth)acrylate, (iso)octyl (meth)acrylate, (iso)decyl (meth)acrylate, (iso)dodecyl (meth)acrylate, (iso)stearyl (meth)acrylate, 2-hydroxyethyl (meth)acrylate and 3-hydroxypropyl (meth)acrylate; styrenic monomers such as styrene, vinyltoluene, 2-methylstyrene and chlorostyrene; and the like. These can be used alone or in admixture of at least two kinds. Incidentally, "(iso or tertiary)butyl" means n-butyl, isobutyl or tertiary butyl. Also, "(iso)" means n- or iso.

It is preferable that the component (d) contains a styrenic monomer from the viewpoint of improving optical density and high-lighter fastness. As the styrenic monomer, styrene and 2-methylstyrene are preferable. These styrenic monomers can be used alone or in admixture thereof. In this case, it is desired that the content of the styrenic monomer in the component (d) is 10 to 100% by weight, preferably 40 to 100% by weight, from the viewpoint of improvement in optical density and high-lighter fastness.

In addition, it is preferable that the component (d) contains a hydroxyl group-containing monomer from the viewpoint of jetting stability in an inkjet printer. As the hydroxyl group-containing monomer, 2-hydroxyethyl (meth)acrylate and 3-hydroxypropyl (meth)acrylate are preferable, and these can be used alone or in admixture thereof. In this case, the content of the hydroxyl group-containing monomer in the component (d) is 10 to 80% by weight, preferably 15 to 50% by weight, from the viewpoint of jetting stability in an inkjet printer.

It is desired that the content of the component (a) in the vinyl polymer is 1 to 50% by weight, preferably 5 to 40% by weight, from the viewpoint of dispersion stability of the dispersion obtained.

It is desired that the content of the component (b) in the vinyl polymer is 5 to 50% by weight, preferably 10 to 40% by weight, from the viewpoints of jetting stability and dispersion stability.

In addition, it is preferable that the total content of the component (a) and the component (b) in the vinyl polymer is 6 to 75% by weight from the viewpoints of dispersion stability in water and jetting stability.

It is desired that the content of the component (c) in the vinyl polymer is 1 to 25% by weight, preferably 5 to 20% by weight, from the viewpoint of increasing the content of an oil-soluble black dye or carbon black in the vinyl polymer and from the viewpoint of suppressing scorching on the heater surface of an inkjet printer.

It is desired that the content of the component (d) in the vinyl polymer is 5 to 93% by weight, preferably 10 to 80% by weight, from the viewpoint of suppression of scorching on the heater surface of an inkjet printer and from the viewpoint of stability. When the component (d) comprising the styrenic monomer is used, it is preferable that the content of the component (d) in the vinyl polymer is 10 to 60% by weight. Also, when the component (d) comprising the hydroxyl group-containing monomer is used, it is preferable that the content of the component (d) in the vinyl polymer is 1 to 30% by weight.

The vinyl polymer is prepared by polymerizing the monomers (a) to (d) by means of a known polymerization method such as a bulk polymerization method, a solution polymerization method, a suspension polymerization method, or an emulsion polymerization method. Among these polymerization methods, the solution polymerization method is preferable.

The solvent used in the solution polymerization method is not limited to specified ones, and any of water-miscible organic solvents and water-insoluble organic solvents can be used. Examples of the solvent include an aliphatic alcohol having 1 to 3 carbon atoms; ketones such as acetone and methyl ethyl ketone; esters such as ethyl acetate; toluene, and the like. Among them, ethanol, acetone, methyl ethyl ketone and toluene are preferable.

Incidentally, a radical polymerization initiator can be used in the polymerization. As the radical polymerization initiator, any of azo compounds and organic peroxides may be used. It is preferable that the amount of the radical polymerization initiator is 0.001 to 5% by mol, especially 0.01 to 2% by mol based on the total amount of the components (a) to (d).

In the polymerization, a polymerization chain transfer agent may be further added. The polymerization chain transfer agent includes mercaptans, xanthogenndisulfides, thiuram disulfides, halogenated hydrocarbons, and the like. It is preferable that the amount of the polymerization chain transfer agent is usually 0.001 to 5 parts by weight based on 100 parts by weight of the monomers used.

The conditions for polymerizing the monomers (a) to (d) differ depending upon kinds of the radical polymerization initiator, the monomers and the solvent used, and the like. The polymerization temperature is usually 30° to 100° C., preferably 50° to 80° C., and the polymerization time period is usually 1 to 20 hours. In addition, it is preferable that the polymerization atmosphere is an atmosphere of an inert gas such as nitrogen gas.

After the termination of the polymerization reaction, a copolymer can be isolated from the reaction solution by a known method such as reprecipitation or distilling off of the solvent. Also, the resulting copolymer can be purified by the removal of unreacted monomers and the like by the repeat of reprecipitation, membrane separation, chromatography or extraction.

The weight-average molecular weight of the vinyl polymer (as determined by the method described in Preparation Example 1) is preferably 3000 to 200000, more preferably 5000 to 100000, from the viewpoints of jetting property, prevention of scorching on a printer head, durability of the water-based ink after printing, and stability of the dispersion.

The oil-soluble black dyes used in the present invention include C.I. Solvent Black 3, C.I. Solvent Black 7, C.I. Solvent Black 27, C.I. Solvent Black 29, C.I. Solvent Black 34, and the like. Also, the carbon black includes Monarch 880, Monarch 280, Monarch 400, Regal 400R and Mogul L (hereinbefore trade names manufactured by Cabot Corporation); PRINTEX-L, PRINTEX-150T, PRINTEX-90, PRINTEX-60 and PRINTEX-80 (hereinbefore trade names manufactured by Degussa-AG); #950, #960 and MA 600 (hereinbefore trade names manufactured by Mitsubishi Chemical Corporation), and the like.

It is desired that the total amount of the oil-soluble black dye and the carbon black is 20 to 400 parts by weight, preferably 30 to 300 parts by weight, based on 100 parts by weight of the resin solid content of the vinyl polymer, from the viewpoints of optical density and facilitation of including the black dye or the carbon black into the vinyl polymer.

The aqueous dispersion of the vinyl polymer particles containing the oil-soluble black dye or the carbon black can be prepared by, for example, (i) a process comprising dissolving the vinyl polymer together with the oil-soluble black dye in a hydrophilic organic solvent, adding a neutralizing agent as occasion demands to cationize or anionize the salt-forming group of the polymer, adding water to the resulting mixture, and thereafter distilling off the hydrophilic organic solvent to phase-invert to a water-based system;

(ii) a process comprising dissolving the vinyl polymer in an organic solvent, adding a neutralizing agent as occasion demands to cationize or anionize the salt-forming group of the polymer, adding water and carbon black and kneading them, and distilling off the organic solvent from the kneaded product to give a water-based system;

(iii) a process comprising adding water, a neutralizing agent and, as occasion demands, a surfactant to a solution obtained by dissolving the vinyl polymer and the oil-soluble black dye in a water-insoluble organic solvent to cationize or anionize the salt-forming group of the polymer, emulsifying the resulting mixture, and thereafter distilling off the water-insoluble organic solvent to give a aqueous dispersion; or the like.

The neutralizing agent usable for neutralizing the cationic group includes inorganic acids such as hydrochloric acid, nitrous acid, sulfuric acid and phosphoric acid; and organic acids such as a carboxylic acid having 1 to 5 carbon atoms, a dialkylphosphoric acid having 2 to 20 carbon atoms, and oxyacids such as lactic acid, glycolic acid, glyceric acid and gluconic acid. Also, the neutralizing agent usable for neutralizing the anionic group includes alkali metal hydroxides such as sodium hydroxide, potassium hydroxide and lithium hydroxide; basic substances such as ammonia, triethylamine and morpholine; alcoholamines such as triethanolamine, diethanolamine and N-methyldiethanolamine, and the like. It is desired that the neutralization degree is adjusted so that the resulting aqueous dispersion becomes neutral.

The average particle diameter of the vinyl polymer particles including the oil-soluble black dye or the carbon black is preferably 0.01 to 0.50 $\mu$m, more preferably 0.02 to 0.20 $\mu$m, from the viewpoints of prevention of generation of blotting and stability of the dispersion.

It is desired that the amount of the aqueous dispersion A of the vinyl polymer particles containing the oil-soluble black dye or the carbon black in the water-based ink is usually adjusted so that the content of the vinyl polymer particles in the water-based ink is 1 to 35% by weight, preferably 2 to 15% by weight, from the viewpoints of optical density and jetting stability.

The amount of the oil-soluble black dye or the carbon black is preferably 20 to 400 parts by weight, more preferably 30 to 300 parts by weight, based on 100 parts by weight of the solid content of the vinyl polymer, from the viewpoints of optical density and facilitation of including the oil-soluble black dye or the carbon black in the vinyl polymer.

Although the aqueous dispersion B of the carbon black is poor in water resistance, it can increase the content of the carbon black as compared with the aqueous dispersion A. Therefore, there can be exhibited an excellent effect that the optical density of the water-based ink of the present invention can be increased.

The aqueous dispersion B of the carbon black has the same ionicity as the aqueous dispersion A from the viewpoint of preventing the aggregation when mixed with the aqueous dispersion A.

The ionicity refers not to the ionicity of each component such as the vinyl polymer, the water-soluble dispersant and the carbon black, but to the ionicity of the aqueous dispersion A or the aqueous dispersion B as a whole. Specifically, it means that if the aqueous dispersion A is cationic, then the aqueous dispersion B is cationic, and that if the aqueous dispersion A is anionic, then the aqueous dispersion B is anionic. The determination of whether the dispersion is cationic or anionic is carried out by, for example, determination of zeta potential.

The aqueous dispersion B includes an aqueous dispersion of carbon black, prepared by dispersing carbon black in water with a water-soluble dispersant, or an aqueous dispersion of carbon black, prepared by dispersing in water a self-dispersible carbon black on which surface a compound capable of dispersing is directly bonded. Among them, from the viewpoint of allowing for a smaller amount of the dispersant, the aqueous dispersion of carbon black, prepared by dispersing in water a self-dispersible carbon black on which surface a compound capable of dispersing is directly bonded is preferable.

The water-soluble dispersant used for the aqueous dispersion of carbon black prepared by dispersing carbon black in water with a water-soluble dispersant can be any of water-soluble dispersants, as long as it is water-soluble and gives excellent dispersion stability even when the aqueous dispersion comprises a large amount of carbon black, and is not limited to specified ones. Representative examples of the water-soluble dispersant include water-soluble styrenic resins, water-soluble acrylic resins, water-soluble polyester-based resins, water-soluble polyurethane-based resins, and the like. In the case of the anionic dispersant, there is preferable a water-soluble copolymer of at least one selected from the group consisting of styrene, a substituted styrene and a (meth)acrylate, and (meth)acrylic acid. Also, in the case of the cationic dispersant, there is preferable a water-soluble copolymer of at least one monomer selected from the group consisting of styrene, a substituted styrene and a (meth)acrylate, and a tertiary amine-containing unsaturated monomer such as N,N-dimethylaminoethyl acrylate, N,N-dimethylaminoethyl methacrylate, N-(N',N'-dimethylaminopropyl)acrylamide or N-(N',N'-dimethylaminopropyl)methacrylamide. It is desired that the amount of the carbon black is 40 to 400 parts by weight, preferably 60 to 300 parts by weight, based on 100 parts by weight of the water-soluble dispersant.

In the aqueous dispersion of carbon black, prepared by dispersing in water a self-dispersible carbon black on which surface a compound capable of dispersing is directly bonded, the above-mentioned self-dispersible carbon black can be-prepared, for example, by bonding at least one anionic or cationic, hydrophilic group to the surface of the carbon black directly or via another atomic group. The anionic hydrophilic group includes ZOOM, —O$_3$M, —PO$_3$HM, —PO$_3$M$_2$, —SO$_2$NH$_2$, —SO$_2$NHCOR$^7$, and the like, wherein M represents hydrogen atom; an alkali metal such as lithium, sodium or potassium; ammonium; or an organic ammonium such as monomethylammonium group, dimethylammonium group, trimethylammonium group, monoethylammonium group, diethylammonium group, triethylammonium group, monomethanolammonium group, dimethanolammonium group or trimethanolammonium group, and $R^7$ is an alkyl group having 1 to 12 carbon atoms, phenyl group which may have a substituent, or a naphthyl group which may have a substituent. Among them, —COOM and —SO$_3$M are preferable. As the cationic hydrophilic group, a quaternary ammonium group is preferable, among which there is preferable a group represented by the formula:

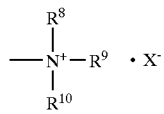

wherein each of $R^8$, $R^9$ and $R^{10}$ is independently hydrogen atom or $R^7$, wherein $R^7$ is as defined above; and X represents a halogen atom such as fluorine atom or chlorine atom, a carboxylic acid such as acetic acid, propionic acid, lactic acid, glycolic acid, gluconic acid or glyceric acid, or an anionic group of an alkylsulfate having 1 to 8 carbon atoms, including the followings:

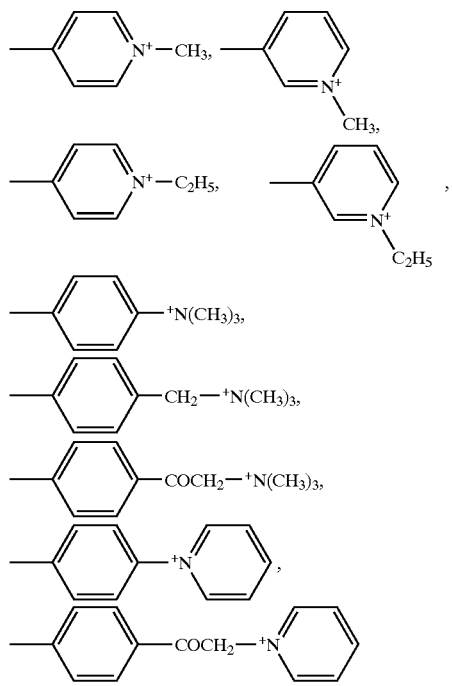

It is desired that the content of the aqueous dispersion B in the water-based ink is 0.2 to 20% by weight, preferably 0.5 to 10% by weight, from the viewpoint of improving optical density.

The primary particle diameter (the average particle diameter being determined by SEM observation) of the carbon black contained in the aqueous dispersion B is preferably at least 0.02 μm, more preferably 0.03 to 0.10 μm, from the viewpoint of further improving the optical density.

The average particle diameter of the solid content in the aqueous dispersion B is preferably 0.01 to 0.50 μm, more preferably 0.02 to 0.20 μm, from the viewpoint of stability of the dispersion.

The amounts of the aqueous dispersion A and the aqueous dispersion B are adjusted so that the weight ratio of the solid content of the aqueous dispersion A to the solid content of the aqueous dispersion B (the aqueous dispersion A/the aqueous dispersion B) becomes 5/95 to 95/5, preferably 10/90 to 90/10, more preferably 20/80 to 80/20, from the viewpoint of improving fixing ability on paper and optical density.

The total solid content of the aqueous dispersion A and the aqueous dispersion B contained in the water-based ink of the present invention is preferably 1 to 30% by weight, more preferably 3 to 15% by weight, from the viewpoints of optical density and jetting stability.

Additives such as a wetting agent, a dispersant, a defoaming agent, a mildewproof agent and a chelating agent can be added to the water-based ink for ink-jet recording of the present invention as occasion demands.

PREPARATION EXAMPLE 1

A reactor was charged with 20 parts (parts by weight, hereinafter referred to the same) of methyl ethyl ketone as a polymerization solvent, and monomers as polymeric unsaturated monomers and a polymerization chain transfer agent listed in the column of initially charged monomers of Table 1, and replacement with nitrogen gas was sufficiently carried out.

On the other hand, a dropping funnel was sufficiently replaced with nitrogen gas, and thereafter charged with monomers and a polymerization chain transfer agent listed in the column of dropping monomers of Table 1, and 60 parts of methyl ethyl ketone and 0.2 parts of 2,2'-azobis(2,4-dimethylvaloronitrile).

The temperature of a mixed solution inside the reactor was increased up to 65° C. under nitrogen gas atmosphere with stirring, and a mixed solution inside the dropping funnel was gradually added thereto dropwise over a period of 3 hours.

After 2 hours passed from the termination of the dropping, a solution prepared by dissolving 0.1 parts of 2,2'-azobis(2,4-dimethylvaloronitrile) in 5 parts of methyl ethyl ketone was added to the reactor, and the mixture was further aged at 65° C. for 2 hours and at 70° C. for 2 hours, to give a copolymer solution.

A part of the resulting copolymer solution was dried at 105° C. under reduced pressure for 2 hours, and isolated by completely removing the solvent from the copolymer solution. The molecular weight was determined by gel permeation chromatography using polystyrene as a standard substance and tetrahydrofuran as a solvent. As a result, the weight-average molecular weight was about 10000.

Five parts of a copolymer obtained by drying the copolymer solution obtained above under reduced pressure was dissolved in 25 parts of methyl ethyl ketone, and 5.2 parts of a neutralizing agent (30% aqueous gluconic acid) was added thereto to neutralize a part of the copolymer. Further, 30 parts of ion-exchanged water and 5 parts of carbon black (manufactured by Cabot Corporation under the trade name: Monarch 880) were added thereto, and the mixture was kneaded in a beads-mill. The organic solvent was completely removed from the resulting kneaded product at 60° C. under reduced pressure, and a part of water was further removed, thereby giving a cationic aqueous dispersion of carbon black-containing vinyl polymer (hereinafter referred to as "BK-A"), the solid content of which was 20%.

According to zeta-potential measurement, BK-A was cationic. The judgment of the ionic property mentioned below was also carried out by zeta-potential measurement.

PREPARATION EXAMPLE 2

A copolymer solution was obtained in the same manner as in Preparation Example 1 by using monomers and a polymerization chain transfer agent listed in the column of initially charged monomers of Table 1, monomers and a polymerization chain transfer agent listed in the column of dropping monomers of Table 1, and initially charged monomers and dropping monomers shown in Table 1. The molecular weight of the vinyl polymer was determined in the same manner as in Preparation Example 1. As a result, the weight-average molecular weight was about 10000.

To 5 parts of a copolymer obtained by drying the copolymer solution obtained above under reduced pressure were added 25 parts of acetone and 5 parts of an oil-soluble black dye (manufactured by Orient Chemical Co., Ltd under the trade name: Orient Black 860), and the copolymer was completely dissolved. A neutralizing agent (30% aqueous gluconic acid) was added thereto in the amount of 3.2 parts to partially neutralize a salt-forming group of the copolymer, and 300 parts of ion-exchanged water was added. After stirring, the mixture was emulsified by using Microfluidizer (manufactured by Microfluidizer) for 30 minutes. The organic solvent was completely removed from the resulting emulsion at 60° C. under reduced pressure, and the emulsion was concentrated by removing a part of water, thereby giving a cationic dispersion of a black oil-soluble dye-containing vinyl polymer (hereinafter referred to as "BK-B"), the solid content of which was 20%.

PREPARATION EXAMPLE 3

A copolymer solution was obtained in the same manner as in Preparation Example 1 by using monomers and a polymerization chain transfer agent listed in the column of initially charged monomers of Table 1, monomers and a polymerization chain transfer agent listed in the column of dropping monomers of Table 1, and initially charged monomers and dropping monomers shown in Table 1. The molecular weight of the vinyl polymer was determined in the same manner as in Preparation Example 1. As a result, the weight-average molecular weight was about 10000.

The same procedures as in Preparation Example 1 were carried out, except that 25 parts of methyl ethyl ketone, 0.5 parts of a neutralizing agent (30% aqueous sodium hydroxide) and 5 parts of carbon black (manufactured by Degussa, under the trade name: Printex-90) were added to 5 parts of a copolymer obtained by drying the copolymer solution obtained above under reduced pressure, thereby giving an anionic aqueous dispersion of carbon black-containing vinyl polymer (hereinafter referred to as "BK—C"), the solid content of which was 20%.

Each abbreviation for the macromer listed in Table 1 means the followings:

Silicone Macromer: manufactured by CHISSO CORPORATION under the trade name: FM-0711

Styrene Macromer: manufactured by TOAGOSEI CO., LTD. under the trade name of AS-6 [styrene-homopolymerized macromer having a weight-average molecular weight: 6000]

TABLE 1

| Preparation Example 1 | Preparation Example 2 | Preparation Example 3 |
|---|---|---|
| Initially Charged Monomers (Parts) | | |
| Styrene [7.5] | t-Butyl Methacrylate [20] | Styrene [7.5] |
| Lauryl Methacrylate [3] | N,N-Dimethylaminoethyl Methacrylate [20] | Acrylic Acid [2] |
| N,N-Dimethylaminoethyl Methacrylate [10] | Methoxypolyethylene-glycol (9) Methacrylate [5] | Methoxypolyletraethylene-glycol (12) Methacrylate [10] |
| Methoxypolyethlylene-glycol (4) Methacrylate [20] | Silicone Macromer [2] | Styrene Macromer [5] |
| Styrene Macromer [5] | n-Dodecyl Methacrylate [0.2] | 2-Hydroxyethyl Methacrylate [10] |
| Mercaptoethanol [0.2] | | n-Dodecylmercaptan [0.3] |
| Dropping Monomers (Parts) | | |
| Styrene [7.5] | t-Butyl Methacrylate [23] | Styrene [20] |
| Lauryl Methacrylate [5] | N,N-Dimethylaminoethyl Methacrylate [20] | Acrylic Acid [3] |
| N,N-Dimethylaminoethyl Methacrylate [15] | Methoxypolyethylene-glycol (9) Methacrylate [5] | Methoxypolyletraethylene-glycol (12) Methacrylate [15] |
| Methoxypolyethylene-glycol (4) Methacrylate [20] | Silicone Macromer [3] | Styrene Macromer [5] |
| Styrene Macromer [5] | n-Dodecyl Methacrylate [1.8] | 2-Hydroxyethyl Methacrylate [10] |
| Mercaptoethanol [1.8] | | n-Dodecylmercaptan [1.7] |

PREPARATION EXAMPLE 4

Ten grams of carbon black having a surface area of 230 m$^2$/g and a DBP oil absorption of 70 m$^2$l/g, and having a primary particle diameter of 0.028 μm, and 3.06 g of 3-amino-N-ethylpyridinium bromide were thoroughly mixed with 72 g of water, and thereafter 1.62 g of nitric acid was added dropwise thereto, and the mixture was stirred at 70° C. After 4 minutes passed, a solution prepared by dissolving 1.07 g of sodium nitrite in 5 g of water was added thereto, and the mixture was stirred for additional 1 hour.

The resulting slurry was filtered with Toyo Roshi No. 2 (manufactured by ADVANTICE), and the carbon black particles were sufficiently washed with water. This wet cake-like carbon black was re-dispersed in 3000 mL of water, and desalted with a reverse osmotic membrane until the electric conductivity attained to 0.2 μs. Further, this liquid dispersion of carbon black was concentrated to a carbon black concentration of 10%, thereby giving a cationic, self-dispersible carbon black aqueous dispersion, to the surface of which a group represented by the formula:

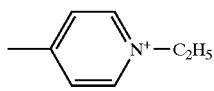

was bonded (hereinafter referred to as BK-D).

PREPARATION EXAMPLE 5

Three-hundred grams of a commercially available acidic carbon black (manufactured by Mitsubishi Chemical Corporation under the trade name: MA-7, primary particle diameter: 0.024 μm) was mixed with 1000 mL of water, and thereafter 450 g of sodium hypochlorite (effective chlorine concentration 12%) was added dropwise thereto, and the mixture was stirred at 100° to 105° C. for 10 hours. The resulting slurry was filtered with Toyo Roshi No. 2 (manufactured by ADVANTICE) carbon black particles were sufficiently washed with water. This wet cake-like carbon black was re-dispersed in 300 mL of water, and desalted with a reserve osmotic membrane until the electric conductivity attained to 0.2 μs. Further, this liquid dispersion of carbon black was concentrated to a carbon black concentration of 10%, thereby giving a anionic, self-carbon black aqueous dispersion, to the surface of which —COONa group was bonded (hereinafter referred to as BK-E).

EXAMPLE 1

Thirty parts of BK-A, 20 parts of BK-D, 5 parts of glycerol, 5 parts of 2-pyrrolidone, 2 parts of isopropyl alcohol, 1 part of Acetylenol EH (manufactured by Kawaken Fine Chemicals Co., Ltd.) and 37 parts of water were mixed together, to give a liquid dispersion. This liquid dispersion was filtered with a 0.2 gm filter to remove impurities and coarse particles, to give a water-based black ink.

The weight ratio of solid contents of the aqueous dispersion A to the aqueous dispersion B (aqueous dispersion A/aqueous dispersion B) in this ink was 3/1.

EXAMPLE 2

The same procedures as in Example 1 were carried out except that 20 parts of BK-B was used in place of BK-A, that the amount of BK-D added it was changed to 40 parts, and that the amount of water added was changed to 27 parts, to give a water-based black ink.

The weight ratio of solid contents of the aqueous dispersion A to the aqueous dispersion B (aqueous dispersion A/aqueous dispersion B) in this ink was 1/1.

EXAMPLE 3

The same procedures as in Example 1 were carried out except that 32.5 parts of BK—C, 15 parts of BK-E, 5 parts of glycerol, 5 parts of N-methylglycine, 5 parts of urea, 1 part of sodium polyoxyethylene lauryl ether sulfate (manufactured by Kao Corporation under the trade name EMAL 20C), and 36.5 parts of water were used for the components for an ink, to give a water-based black ink.

The weight ratio of solid contents of the aqueous dispersion A to the aqueous dispersion B (aqueous dispersion A/aqueous dispersion B) in this ink was 4.3/1.

EXAMPLE 4

The same procedures as in Example 3 were carried out except that there was used 40 parts of an aqueous dispersion of carbon black (solid content 10%) prepared by dispersing with a sodium salt of an aromatic sulfonic acid-formalin-condensate (manufactured by Kao Corporation under the trade name: Demol C) in place of BK-E, that the amount of BK-C added was changed to 20 parts, and that the amount of water added was changed to 24 parts, to give a water-based black ink.

The weight ratio of solid contents of the aqueous dispersion A to the aqueous dispersion B (aqueous dispersion A/aqueous dispersion B) in this ink was 1/1.

COMPARATIVE EXAMPLE 1

The same procedures as in Example 1 were carried out except that the amount of BK-A added was changed to 40 parts, that the amount of water added was changed to 47 parts, and that BK-D was not added, to give a water-based black ink.

COMPARATIVE EXAMPLE 2

The same procedures as in Example 1 were carried out except that the amount of BK-D added was changed to 80 parts, that the amount of water added was changed to 7 parts, and that BK-A was not added, to give a water-based black ink.

COMPARATIVE EXAMPLE 3

The same procedures as in Example 3 were carried out except that there was used 90 parts of an aqueous dispersion of carbon black (solid content 10%) prepared by dispersing with a sodium salt of an aromatic sulfonic acid-formalin-condensate (manufactured by Kao Corporation under the trade name: Demol C) in place of BK-E, that the amount of water added was changed to 4 parts, and that BK-C was not added, to give a water-based black ink.

COMPARATIVE EXAMPLE 4

The same procedures as in Comparative Example 3 were carried out except that 8 parts of a water-soluble black dye (C.I. Direct Black 195) and 76 parts of water were used in place of the aqueous dispersion of carbon black (solid content 10%) prepared by dispersing with a sodium salt of an aromatic sulfonic acid-formalin-condensate (manufactured by Kao Corporation under the trade name: Demol C), to give a water-based black ink.

The physical properties of the black inks obtained in Examples 1 to 4 and Comparative Examples 1 to 4 were evaluated by the following methods. The results are shown in Table 2.

(1) Optical Density

Solid image printing was carried out on a regenerated paper for PPC (manufactured by Nippon Kako Seishi K.K.) using a bubble jet printer (manufactured by Hewlett Packard Co., under the model number of "Desk Jet 720C"), and the printed image was allowed to stand for drying at room temperature for 24 hours, and thereafter its optical density was determined by using a Macbeth densitometer (manufactured by Macbeth Process Measurements Co. under the product number of RD918).

(2) Distortion of Printed Objects

An extent of distortion was observed with naked eyes when ruled lines were printed using the above-mentioned printer, and evaluated on the basis of the following evaluation criteria.

[Evaluation Criteria]

◎: No distortion

○: Little distortion

Δ: Some distortion

X: Distortion (3) Water Resistance

Solid image printing was carried out on a regenerated paper for PPC (manufactured by Nippon Kako Seishi K.K.)

by using the above-mentioned printer, and dried at room temperature for 1 hour. The printed copy paper was immersed in stand-still water for 10 seconds, and the paper was vertically lifted therefrom. The optical density was measured, and the residual ratio of the optical density after immersion to the optical density immediately after solid image printing was determined. The water resistance was evaluated on the basis of the following evaluation criteria:

[Evaluation Criteria]

⊚: Residual ratio being at least 95%

○: Residual ratio being at least 90% and less than 95%

Δ: Residual ratio being at least 70% and less than 90%

X: Residual ratio being less than 70%

(4) Rubbing Resistance

Solid image. printing was carried out on a regenerated paper for PPC (manufactured by Nippon Kako Seishi K.K.) using the above-mentioned printer. After the paper was dried for 1 day, the printed surface was strongly rubbed with a finger. The extent of rub-off of the printed image was observed with naked eyes, and evaluated on the basis of the following evaluation criteria:

[Evaluation Criteria]

○: Substantially no printed image being rubbed off, and its periphery being not stained.

Δ: Some printed images being rubbed off, its periphery being stained, and finger also being stained a little.

X: Printed images being considerably rubbed off, its periphery being considerably stained, and finger also being considerably stained.

(5) High Lighter-Fastness

Text printing was carried out on a regenerated paper for PPC (manufactured by Nippon Kako Seishi K.K.) by using the above-mentioned printer. After 6 hours passed, the extent of staining of the printed sample was observed with naked eyes after traced with a commercially available aqueous fluorescent marker (manufactured by PILOT CORPORATION under the trade name of "Spotlighter"), and evaluated on the basis of the following evaluation criteria:

[Evaluation Criteria]

⊚: No stains such as rubbed stains were observed even when traced with a fluorescent marker.

○: Some rubbed stains were generated when traced with a fluorescent marker, but such stains would cause no problems in practical uses.

X: Generation of rubbed stains was observed when traced with a fluorescent marker, and the stains were remarkable.

TABLE 2

| | Physical Properties of Water-Based Ink | | | | |
|---|---|---|---|---|---|
| | Optical Density | Distortion | Water Resistance | Rubbing Resistance | High Lighter-Fastness |
| Example No. | | | | | |
| Ex. 1 | 1.43 | ⊚ | ⊚ | ○ | ⊚ |
| Ex. 2 | 1.38 | ○ | ⊚ | ○ | ○ |
| Ex. 3 | 1.41 | ○ | ⊚ | ○ | ⊚ |
| Ex. 4 | 1.40 | ⊚ | ○ | ○ | ○ |
| Comp. Ex. | | | | | |
| 1 | 1.28 | ⊚ | ⊚ | ○ | ⊚ |
| 2 | 1.42 | ○ | ○ | X | X |
| 3 | 1.39 | Δ | Δ | X | X |
| 4 | 1.44 | ⊚ | X | ○ | ○ |

It can be seen from the results shown in Table 2 that the water-based inks obtain in Examples 1 to 4 have high optical density, do not give distortion to printed objects, and also have excellent water resistance, excellent rubbing resistance and excellent high lighter-fastness.

INDUSTRIAL APPLICABILITY

The water-based ink of the present invention has high optical density, does not give distortion to printed objects, and also has excellent water resistance, excellent rubbing resistance and excellent high lighter-fastness. Therefore, the water-based ink of the present invention can be suitably used for inkjet recording.

What is claimed is:

1. A water-based ink for inkjet printing, comprising:

(A) an aqueous dispersion A of vinyl polymer particles prepared by including an oil-soluble black dye or carbon black in a water-insoluble vinyl polymer prepared by copolymerizing a salt-forming group-containing monomer (a), a monomer (b) represented by the formula (I):

$$CH_2=C(R^1)COO(R^2O)_pR^3 \qquad (I)$$

wherein $R^1$ is hydrogen atom or a lower alkyl group; $R^2$ is a divalent hydrocarbon group which may have a hetero-atom; $R^3$ is a monovalent hydrocarbon group which may have a hetero-atom; p is a number of 1 to 60, a macromer (c), a monomer (d) copolymerizable with these monomers; and (B) an aqueous dispersion B of carbon black having the same ionicity as the aqueous dispersion A, wherein the weight ratio of the solid content of the aqueous dispersion A to the solid content of the aqueous dispersion B (the solid content of the aqueous dispersion A/the solid content of the aqueous dispersion B) is 5/95 to 95/5.

2. The water-based ink according to claim 1, wherein the aqueous dispersion B is an aqueous dispersion of carbon black, prepared by dispersing carbon black in water with a water-soluble dispersant, or an aqueous dispersion of carbon black, prepared by dispersing in water a self-dispersible carbon black on which surface a compound capable of dispersing is directly bonded.

3. The water-based ink for inkjet printing according to claim 1 or 2, wherein the macromer is a silicone macromer represented by the formula (II):

$$X(Y)_qSi(R^4)_{3-r}(Z)_r \qquad (II)$$

wherein X is a polymerizable unsaturated group; Y is a divalent group; each of $R^4$ is independently hydrogen atom, a lower alkyl group, an aryl group or an alkoxy group; Z is a monovalent siloxane polymer residue having a number-average molecular weight of not less than 500; q is 0 or 1; and r is an integer of 1 to 3, and/or a styrenic macromer having a polymerizable functional group at one end.

4. The water-based ink according to claim 1, wherein the primary particle diameter of the carbon black contained in the aqueous dispersion B is at least 0.02 μm.

* * * * *